United States Patent
Kraft

(10) Patent No.: US 12,540,689 B2
(45) Date of Patent: Feb. 3, 2026

(54) VALVE CORE REMOVAL TOOL

(71) Applicant: OCD INNOVATIONS LLC, Boynton Beach, FL (US)

(72) Inventor: Robert Alan Kraft, Boynton Beach, FL (US)

(73) Assignee: OCD INNOVATIONS LLC, Boynton Beach, FL (US)

( * ) Notice: Subject to any disclaimer, the term of this patent is extended or adjusted under 35 U.S.C. 154(b) by 0 days.

(21) Appl. No.: 19/177,100

(22) Filed: Apr. 11, 2025

(65) Prior Publication Data
US 2025/0320933 A1    Oct. 16, 2025

Related U.S. Application Data

(60) Provisional application No. 63/633,495, filed on Apr. 12, 2024.

(51) Int. Cl.
*F16K 43/00*    (2006.01)

(52) U.S. Cl.
CPC .................... *F16K 43/003* (2013.01)

(58) Field of Classification Search
CPC ............................. F16K 43/003; F16K 51/00
USPC ....................................... 62/77, 292
See application file for complete search history.

(56) References Cited

U.S. PATENT DOCUMENTS

| | | | | |
|---|---|---|---|---|
| 2,464,563 A | * | 3/1949 | Doeg | F25B 45/00 62/331 |
| 3,645,496 A | * | 2/1972 | Rawlins | F25B 45/00 251/291 |
| 3,840,967 A | * | 10/1974 | Olson | F25B 45/00 137/328 |
| 3,916,641 A | * | 11/1975 | Mullins | F25B 45/00 62/77 |
| 3,935,713 A | * | 2/1976 | Olson | B25B 27/24 62/77 |
| 3,996,765 A | * | 12/1976 | Mullins | F25B 45/00 62/77 |

(Continued)

OTHER PUBLICATIONS

Aupoko, "Aupoko Valve Core Remover Installer Tool, R410A R22 AC Schrader Valve Core Remover, Dual Size 1/4"-5/16" Port HVAC Valve Core Removal Installer for Refrigeration Air Conditioning A/C Line Repair Tools", Item model No. R410A R22 AC Schrader Valve Core Remover, ASIN B07T1PBD6T, Jun. 14, 2019, webpage, https://www.amazon.com/dp/B07T1PBD6T/ref=sspa_dk_detail_0.

(Continued)

*Primary Examiner* — Eric S Ruppert
*Assistant Examiner* — Gustavo A Hincapie Serna
(74) *Attorney, Agent, or Firm* — Jacob M. Ward; Ward Law Office LLC

(57) ABSTRACT

A valve core removal tool for an air-conditioning system includes a main body. The main body can include a system port, a first port, a second port, and a third port. The system port can be coupled to the air-conditioning system. The first port can be in fluid communication with the system port via a first channel. The first port can include a first valve and a first coupling. The second port can be in fluid communication with the system port via the second channel. The second port can include a second valve and a second coupling. The third port can be in fluid communication with the system port via a third channel. The third port can include a third valve, a third coupling, and a valve core assembly.

20 Claims, 7 Drawing Sheets

(56) References Cited

U.S. PATENT DOCUMENTS

| | | | | |
|---|---|---|---|---|
| 4,248,263 | A * | 2/1981 | Langill, Jr. | F15B 11/0426 137/454.2 |
| 4,338,793 | A * | 7/1982 | O'Hern, Jr. | F25B 45/00 285/133.11 |
| 5,139,049 | A * | 8/1992 | Jensen | F16L 37/36 137/614.05 |
| 5,357,763 | A * | 10/1994 | Vogel | F25B 45/00 62/77 |
| 6,003,905 | A * | 12/1999 | Moffa | F25B 41/40 285/133.11 |
| 6,253,436 | B1 | 7/2001 | Barjesteh et al. | |
| 6,269,840 | B1 * | 8/2001 | Beaver | F16K 1/04 137/637.4 |
| 6,298,886 | B1 * | 10/2001 | Robinson | F25B 45/00 251/149.6 |
| 6,901,947 | B2 | 6/2005 | Danielson et al. | |
| 7,559,245 | B2 * | 7/2009 | Knowles | F25B 45/00 73/741 |
| 8,056,581 | B2 * | 11/2011 | Danielson | F16L 37/44 251/149.6 |
| 10,139,839 | B2 * | 11/2018 | Loeffler | F16K 1/526 |
| 11,549,612 | B1 * | 1/2023 | Jones | F16K 27/067 |
| 11,879,565 | B1 | 1/2024 | Kuo | |
| 11,919,338 | B2 | 3/2024 | Soltmann et al. | |
| 2002/0096209 | A1 * | 7/2002 | Danielson | F16L 37/23 137/15.09 |
| 2004/0182455 | A1 * | 9/2004 | Wells | F16K 11/207 137/594 |
| 2008/0190208 | A1 * | 8/2008 | Appler | F25B 45/00 73/714 |
| 2017/0008157 | A1 * | 1/2017 | Green | B25B 27/24 |
| 2018/0045322 | A1 * | 2/2018 | Dalessio | F16K 11/22 |
| 2018/0073647 | A1 * | 3/2018 | Prescott | F16K 5/06 |
| 2024/0208282 | A1 * | 6/2024 | Soltmann | B60C 29/002 |
| 2024/0229970 | A1 * | 7/2024 | Kuo | F16K 43/003 |

OTHER PUBLICATIONS

Appion, "1/4" Standard Vacuum-Rated Valve Core Removal Tool", SKU: MGAVCT, webpage, https://www.ar-supply.com/products/1-4-standard-vacuum-rated-valve-core-removal-tool.

Tasco Black, "TB635 1/4" connector with ball valve", webpage, https://www.tasco-black.com/product/tb635-1-4-connector-with-ball-valve/.

Written Opinion of the International Authority dated Jun. 6, 2025.

* cited by examiner

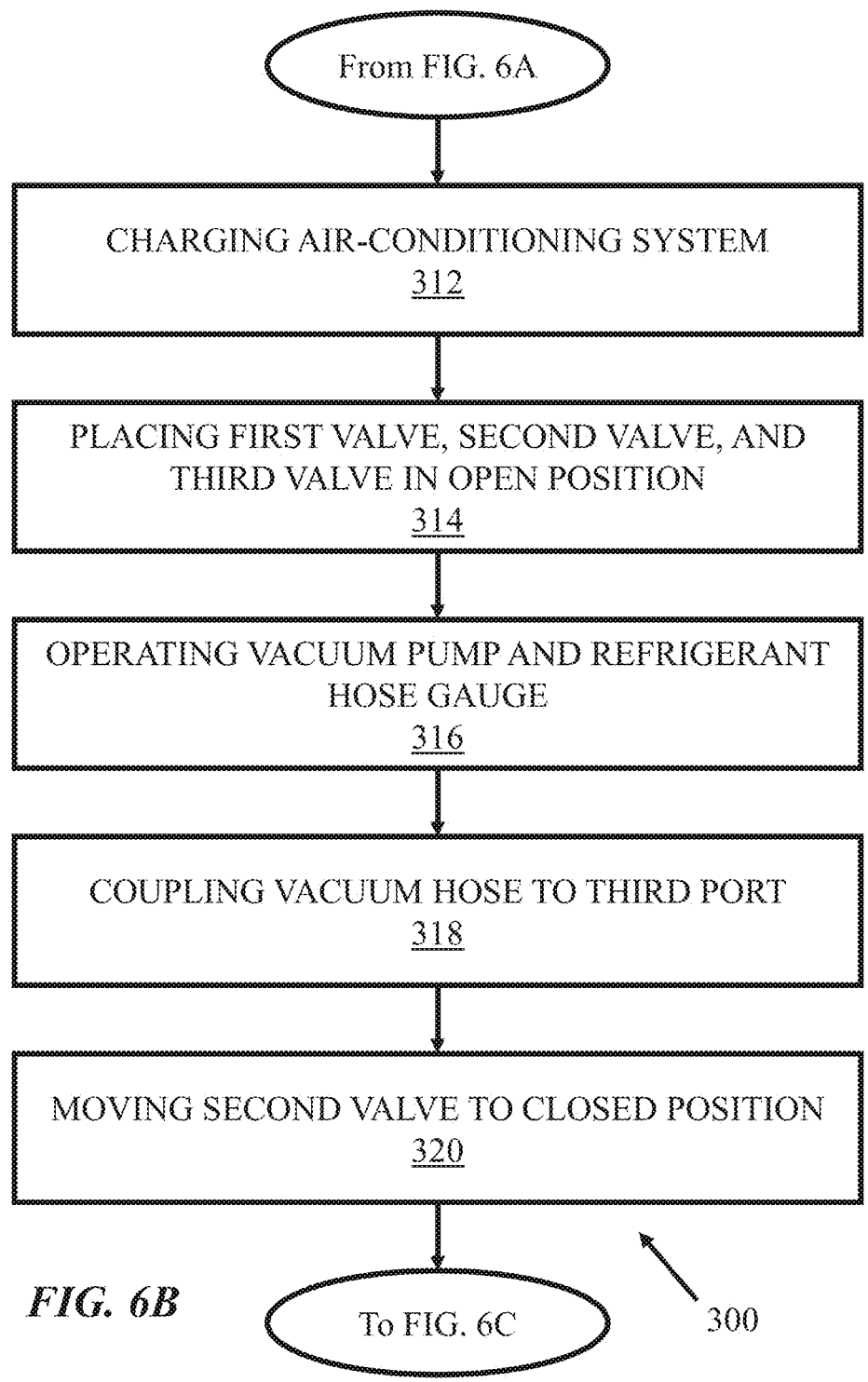

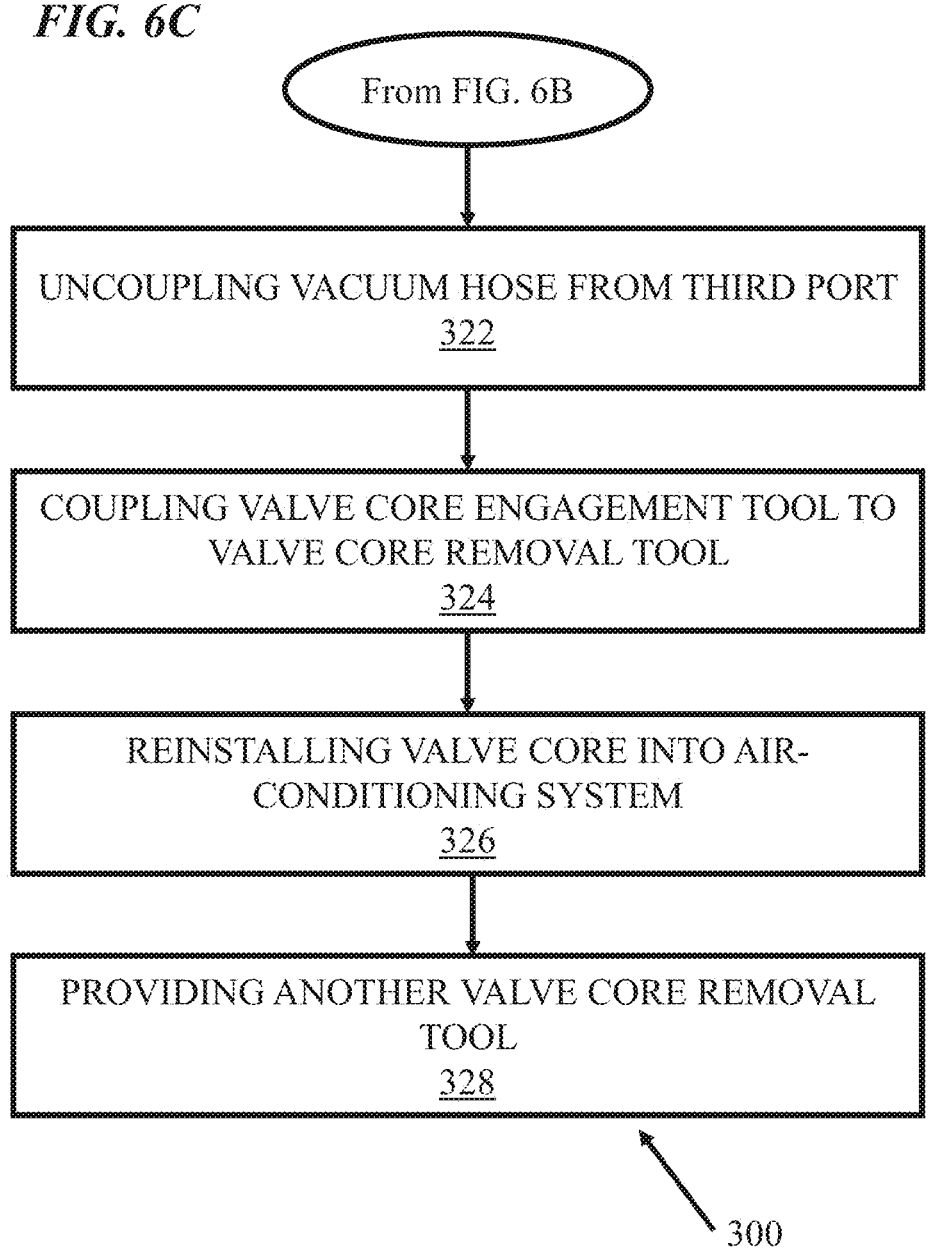

VALVE CORE REMOVAL TOOL

CROSS-REFERENCE TO RELATED APPLICATIONS

This application claims the benefit of U.S. Provisional Application No. 63/633,495, filed on Apr. 12, 2024. The entire disclosure of the above application is incorporated herein by reference.

FIELD

The present technology relates to a valve core removal tool for an air-conditioning system, and, more specifically, to a multi-port valve core removal tool.

INTRODUCTION

This section provides background information related to the present disclosure which is not necessarily prior art.

A Heating, Ventilation, and Air Conditioning (HVAC) system functions to regulate the temperature, airflow, and air quality in a building. The HVAC system ensures comfort by controlling the indoor climate through heating, cooling, and ventilation processes and can include a thermostat, a furnace, an evaporator coil, a condensing unit, vents, and refrigerant lines. The thermostat controls the HVAC system by setting a desired temperature and signaling the system to adjust the temperature when needed. When heating is required, the furnace heats the air, which is then circulated through the building. For cooling, the evaporator coil absorbs heat from the indoor air when the refrigerant evaporates. The refrigerant then travels through a refrigerant line to the condensing (or air conditioning) unit outside, where the unit releases the heat and cools down. Finally, the cooled or heated air is distributed through vents placed throughout the building. The components work together to maintain a comfortable indoor environment by regulating temperature and air quality.

With use over time, the condensing unit of the HVAC system can require charging to maintain proper working order. Charging the condensing unit includes the process of adding refrigerant to the system to facilitate efficient operation. Over time, the refrigerant level can drop due to leaks or normal system wear, leading to reduced performance and higher energy consumption, requiring the condensing unit to be charged to maintain the correct refrigerant level. Without the proper amount of refrigerant, the HVAC system cannot cool as efficiently, and the compressor can be damaged.

When servicing an air-conditioning system, the technician can remove a valve core to gauge system pressure and add refrigerant. The process can include obtaining direct access to the air-conditioning system for performing the maintenance operation and charging the air-conditioning system with refrigerant. The pressure of the refrigerant is an indicator of the level and performance of the refrigerant. The technician can connect a refrigerant line to the air-conditioning system and check both the low pressure and high pressure sides of the system. The low pressure side can help determine how much refrigerant needs to be added to the evaporator coil, while the high pressure side can measure the pressure of the refrigerant as the refrigerant leaves the condensing unit. If the pressures are too low, more refrigerant can be added until the system reaches the recommended pressure range.

Removal of the valve core presents a challenge during the service process. A technician using a valve core removal tool with a limited number of ports faces a juggling act of connections and disconnections. The restricted number of available ports forces the technician to remove either vacuum hoses or vacuum gauges to connect the refrigerant gauge when charging the air-conditioning system, which can create obstacles for the technician, particularly with the use of a flammable refrigerant. Further, the limited number of ports risks contaminating the air-conditioning system with non-condensable liquid and other contaminants that can degrade air-conditioning system performance.

Accordingly, there is a continuing need for a valve core removal tool that enables the technician to maintain connections throughout the vacuum and charging process without requiring hose removal or refrigerant purging.

SUMMARY

In concordance with the instant disclosure, a valve core removal tool that enables the technician to maintain connections throughout the vacuum and charging process without requiring hose removal or refrigerant purging, has surprisingly been discovered.

The present technology includes articles of manufacture, systems, and processes that relate to a valve core removal tool for an HVAC system, specifically a tool that enables efficient removal of a valve core, air-conditioning system evacuation, and refrigerant charging through multiple isolated ports with integrated valves.

In certain embodiments, a valve core removal tool for an air-conditioning system includes a main body. The main body can define a hollow chamber. The main body can include a system port, a first port, a second port, and a third port. The system port can be coupled to the air-conditioning system. The first port can be in fluid communication with the system port via a first channel. The first port can include a first valve and a first coupling. The first valve can control flow between the system port and the first port. The second port can be in fluid communication with the system port via the second channel. The second port can include a second valve and a second coupling. The second valve can control flow between the system port and the second port. The third port can be in fluid communication with the system port via a third channel. The third port can include a third valve, a third coupling, and a valve core assembly. The third valve can control flow between the system port and the third port. The valve core assembly can be removably coupled to the third coupling and can include a valve core shaft and a valve core engagement tool. The valve core engagement tool can be disposed at a first end of the valve core assembly and can be configured to interact with the air-conditioning system through the system port. The valve core shaft can be disposed at a second end of the valve core assembly and can be configured to move the valve core engagement tool within the main body.

In certain embodiments, a valve core removal system for an air-conditioning system is provided. The valve core removal system can include the valve core removal tool, as described herein, a vacuum gauge, a refrigerant gauge hose, and a vacuum hose. The vacuum gauge can be coupled to the first port and can measure a pressure within the air-conditioning system and coupled to the first port. The refrigerant gauge hose can be coupled to the second port and can be used to charge the air-conditioning system with a refrigerant. The vacuum hose can be coupled to the third port and can remove a contaminant from within the air-conditioning system.

In certain embodiments, a method for servicing an air-conditioning system having a valve core with a vacuum hose, a refrigerant gauge hose, and a vacuum gauge is provided. The method can include providing a valve core removal tool as described herein. The valve core removal tool can be coupled to the air-conditioning system and the valve core of the air-conditioning system can be removed with the valve core engagement tool. The vacuum hose can be coupled to the third coupling of the third port and the refrigerant gauge hose and the vacuum gauge can be coupled to the first port and the second port. The method can include charging the air-conditioning system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 5A:
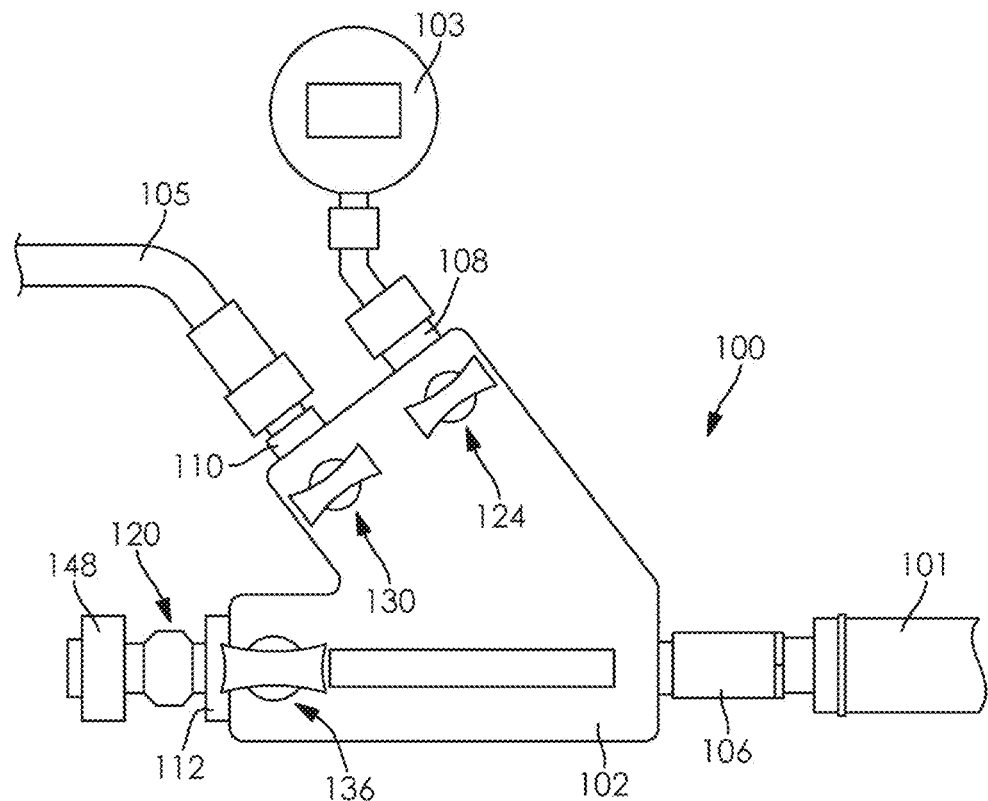
FIG. 5A is a front elevational view of a valve core removal system including the valve core removal tool with the valve core assembly within the valve core removal tool and coupled to the air-conditioning system, a vacuum gauge, a refrigerant gauge hose, and a vacuum hose.
Figure 5B:
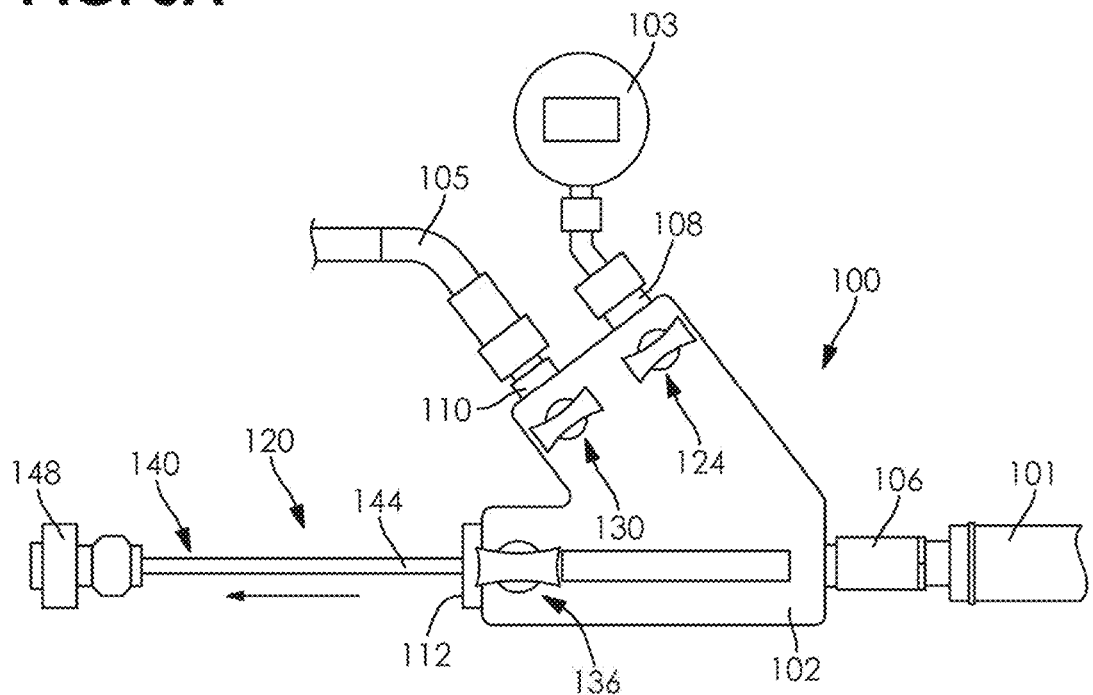
FIG. 5B is a front elevational view of the valve core removal system including the valve core removal tool with the valve core assembly extended from the valve core removal tool and coupled to the air-conditioning system, the vacuum gauge, the refrigerant gauge hose, and the vacuum hose.
Figure 5C:
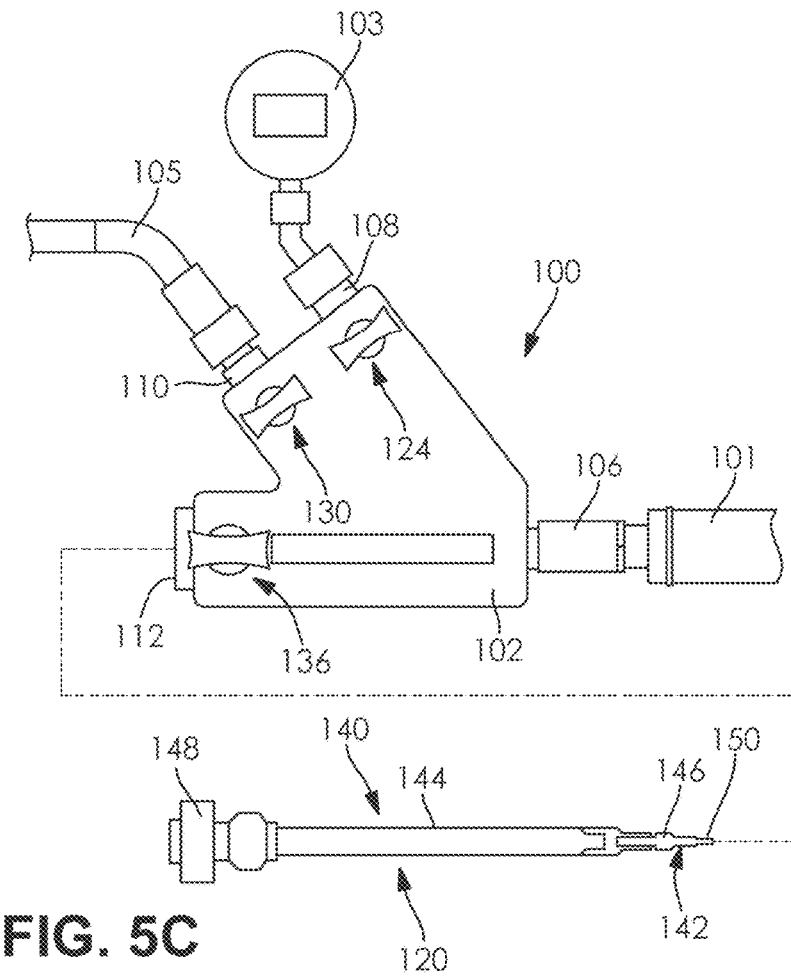
FIG. 5C is a front elevational view of the valve core removal system including the valve core removal tool with the valve core assembly removed from the valve core removal tool and coupled to the air-conditioning system, the vacuum gauge, the refrigerant gauge hose, and the vacuum hose.
Figure 5D:
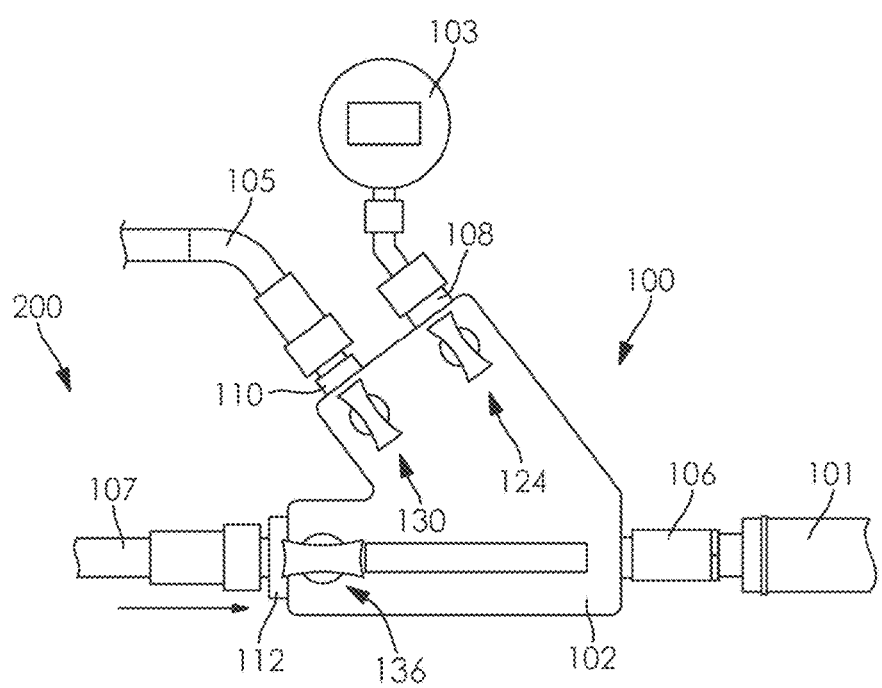
Figure 6A:
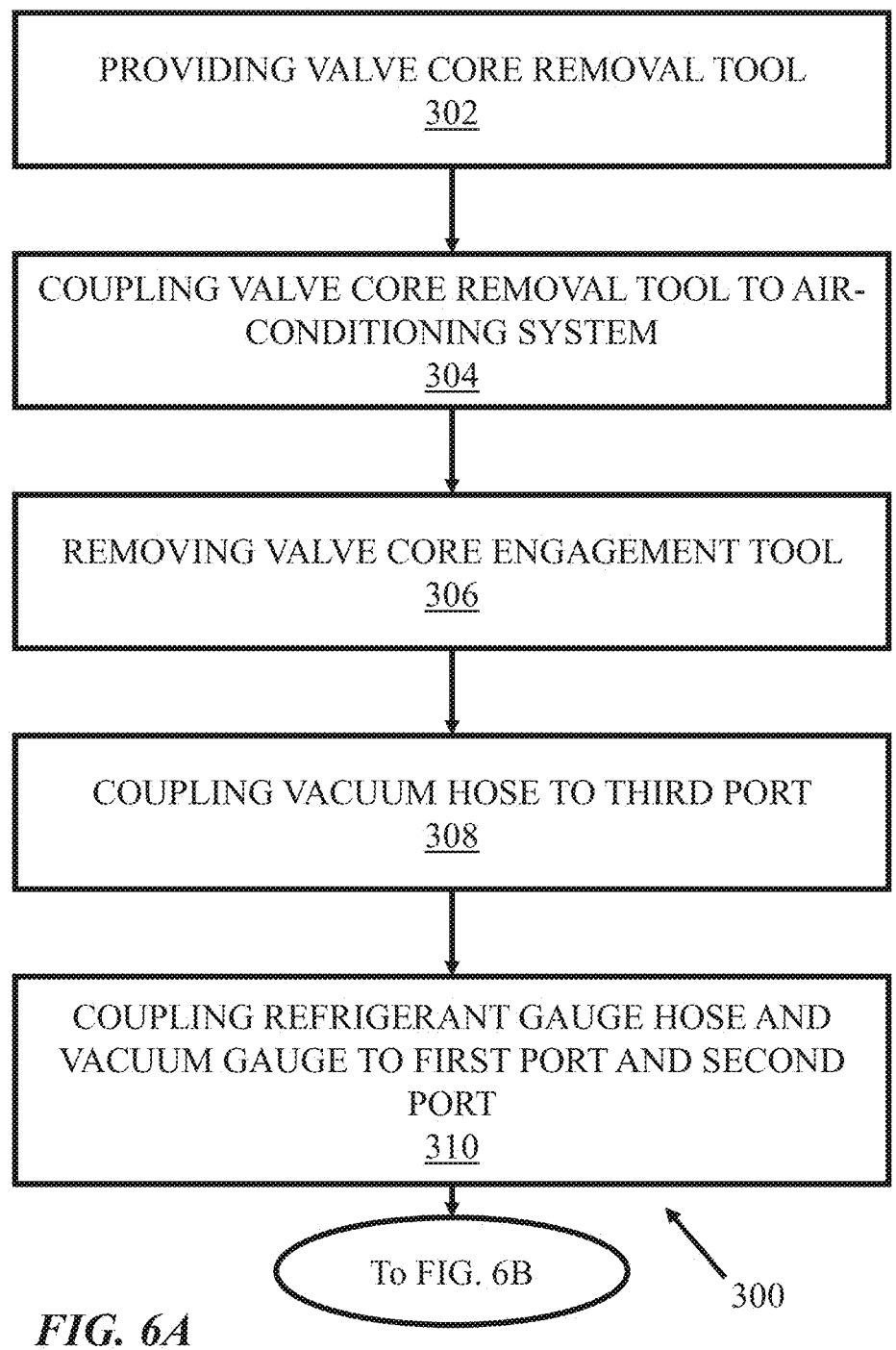

FIG. 5D is a front elevational view of the valve core removal system including the valve core removal tool with the valve core assembly removed from the valve core removal tool and coupled to the air-conditioning system, the vacuum gauge, the refrigerant gauge hose, and the vacuum hose; and FIGS. 6A-6C provide a flow chart depicting a method for servicing an air-conditioning system with a valve core with the vacuum hose, the refrigerant gauge hose, and the vacuum gauge.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description arc to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology includes a valve core removal tool having three-ports that enable simultaneous connection of a vacuum gauge, a refrigerant gauge hose, and a vacuum hose without requiring disconnection or purging during the charging process.

With reference to FIGS. 1-5, a valve core removal tool 100 for an air-conditioning system 101 within a heating, ventilation, and air-conditioning (HVAC) system, is provided. The valve core removal tool 100 can include a three-port main body that can be coupled to the air-conditioning system 101, enabling a technician to simultaneously connect a vacuum gauge 103, a refrigerant gauge hose 105, and a vacuum hose 107. The valve core removal tool 100 can allow the technician to remove a valve core from the air-conditioning system 101 while maintaining the integrity of the air-conditioning system through dedicated ports, each operable with an individual valve control. Where connected to an HVAC system, the valve core removal tool 100 can enable the technician to perform a vacuum operation by providing unrestricted flow through the removed valve core, while simultaneously allowing pressure monitoring and refrigerant charging capabilities without breaking the vacuum seal. The valve core removal tool 100 can help in maintaining proper refrigerant levels and air-conditioning system 101 pressure while militating against the introduction of non-condensable liquid that could otherwise affect the performance of the air-conditioning system 101. The valve core removal tool 100 can allow the technician to vacuum down the air-conditioning system 101 and charge the air-conditioning system 101 without removing any hoses, making the process of monitoring and charging the air-conditioning system 101 more efficient.

Figure 1:
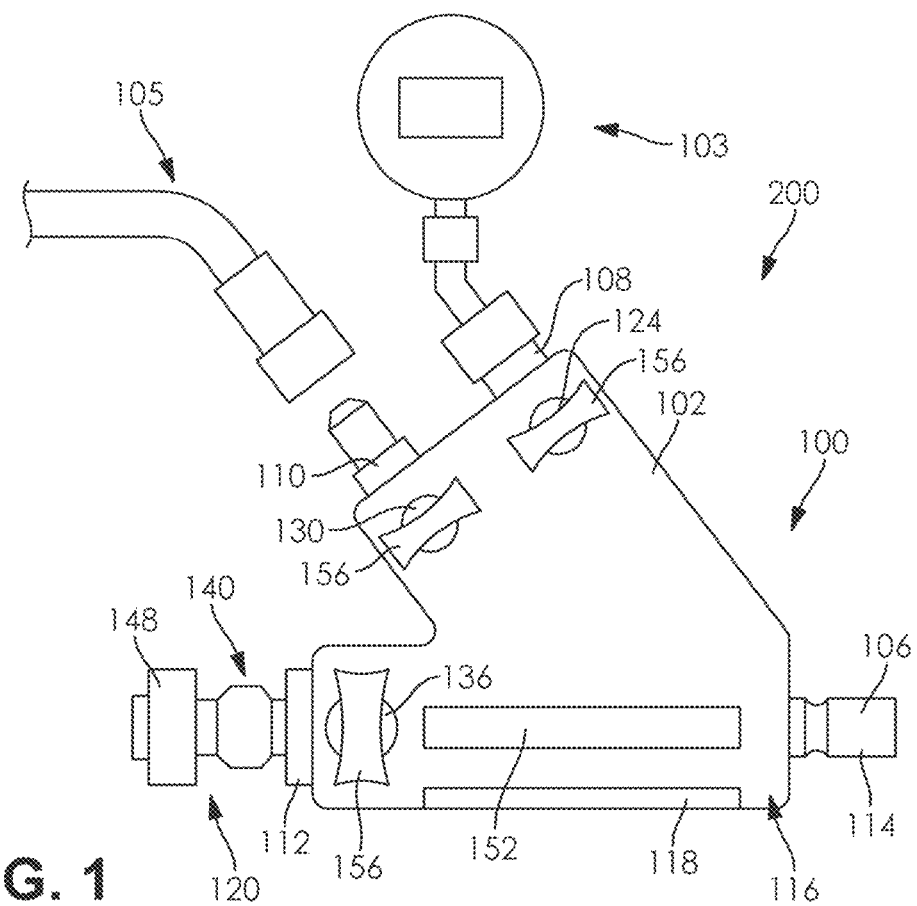
FIG. 1 is a front elevational view of a valve core removal tool with a valve core assembly within the valve core removal tool.
Figure 2:
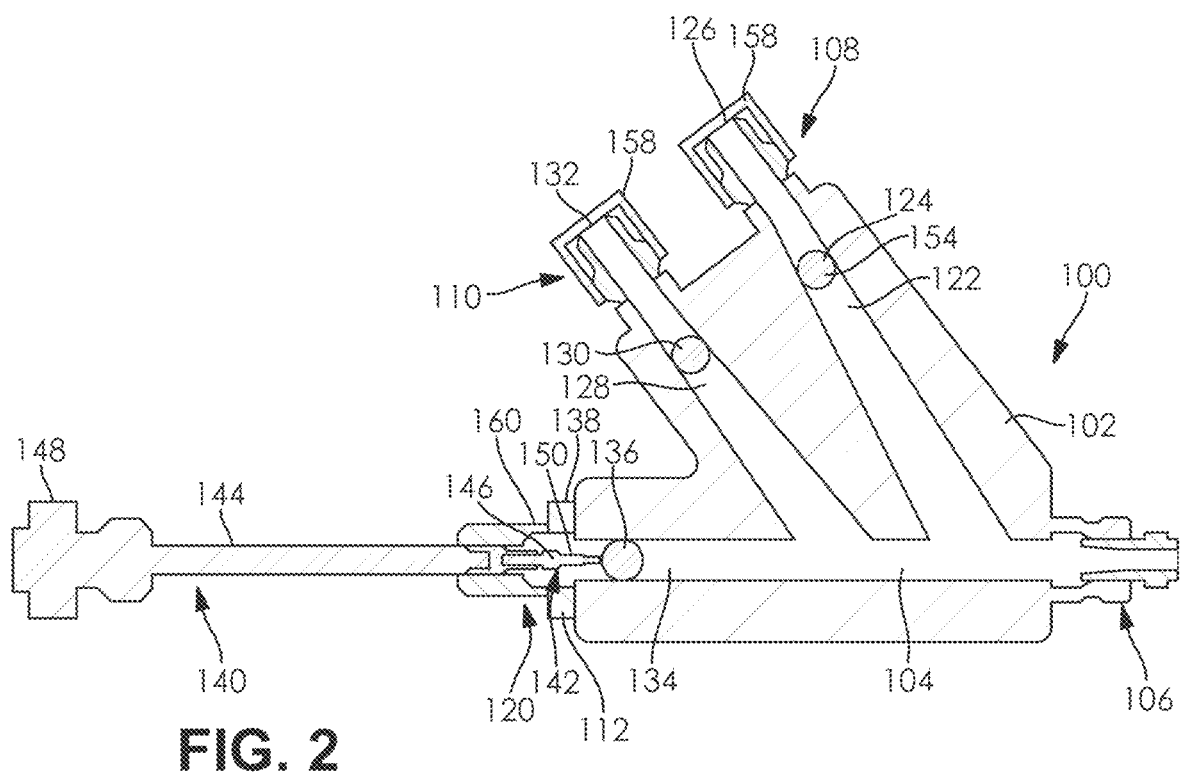
FIG. 2 is a cross-sectional, front elevational view of the valve core removal tool with the valve core assembly extended from the valve core removal tool.
Figure 3:
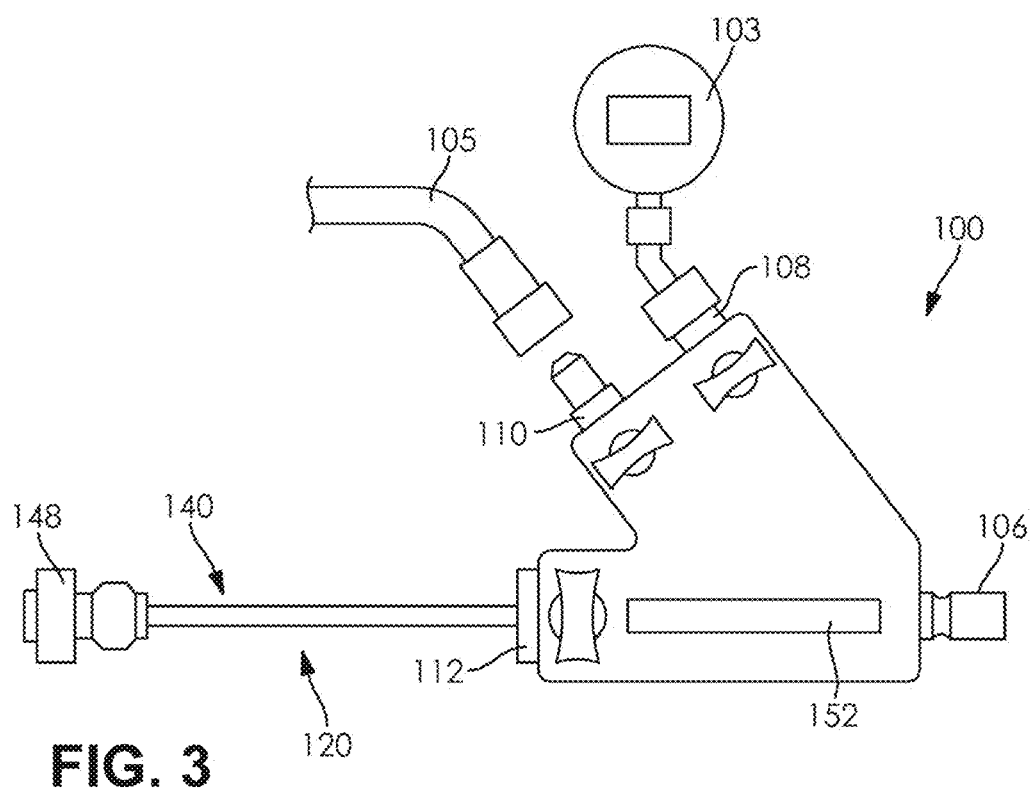
FIG. 3 is a front elevational view of the valve core removal tool with the valve core assembly extended from the valve core removal tool.

As shown in FIGS. 1-2, the valve core removal tool 100 can include a main body 102. The main body 102 can define a hollow chamber 104 for allowing the flow of fluid (e.g., gas and/or liquid) therethrough. The hollow chamber 104 within the main body 102 can permit for a bidirectional flow of fluid, such as refrigerant, during servicing of the air-conditioning system 101. The hollow chamber 104 can facilitate movement of refrigerant within the main body 102. During servicing, and specifically during the evacuation procedure of the air-conditioning system 101, the hollow chamber 104 can allow for the flow of refrigerant and any other contaminants out of the air-conditioning system 101, while during charging operations, the hollow chamber 104 can enable refrigerant to flow into the air-conditioning system 101.

Figure 4:
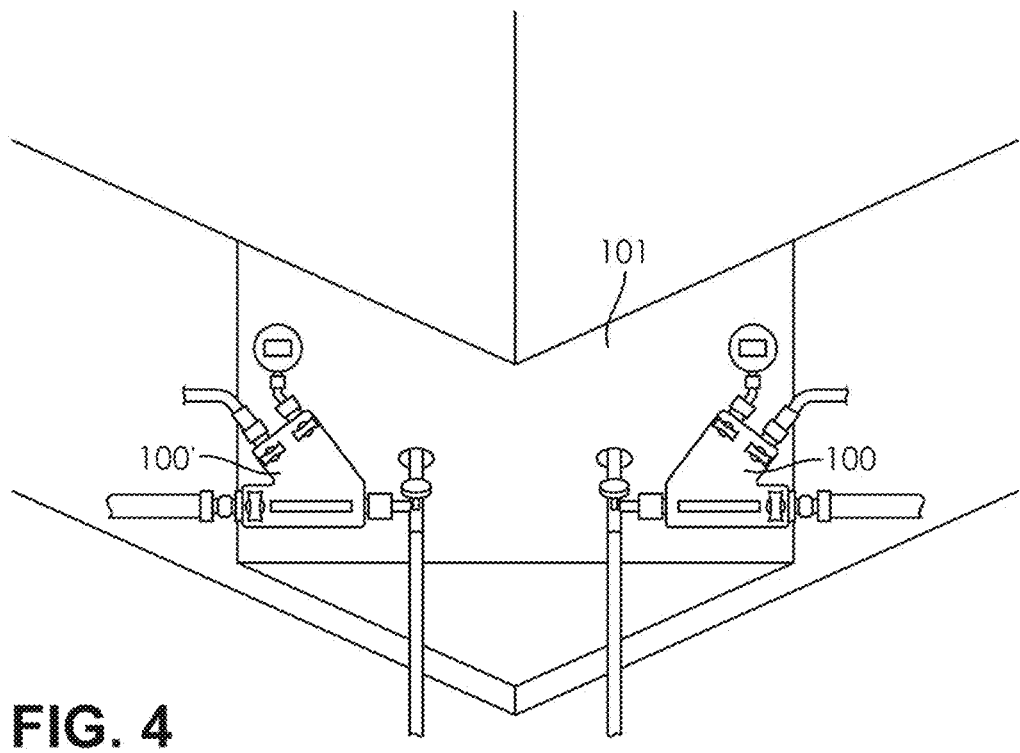
FIG. 4 is an environmental view of the valve core removal tool and another valve core removal tool coupled to an air-conditioning system.

With reference to FIGS. 1 and 4, the main body 102 of the valve core removal tool 100 can be sized to accommodate connections for three separate hoses or gauges while maintaining dimensions that can enable coupling to the air-conditioning system 101. The main body 102 can be constructed in a compact configuration that can reduce storage size when not in use, making the valve core removal tool 100 convenient for a technician to transport between service locations. A skilled artisan can select a suitable size for the valve core removal tool 100 within the scope of the present disclosure.

The main body 102 can be manufactured from a lightweight material such as aluminum or brass, which can allow for easy carrying and handling during the service operation. For example, the main body 102 can be formed from titanium, aluminum, stainless steel, plastic, brass, copper, nickel, combinations thereof, or any material that can provide a rigid structure capable of withstanding pressures encountered in an HVAC system as well as repeated industrial use. The main body 102 can incorporate stainless steel internal components that can militate against corrosion from refrigerants and moisture, while high-impact, rubberized grips can provide durability and secure handling. Additionally, the main body 102 can feature reinforced brass or nickel-plated fittings that can militate against wear and tear from frequent use in industrial applications. A skilled artisan can select a suitable material for the main body 102 and internal components of the main body 102 within the scope of the present disclosure.

With reference to FIG. 2, the main body 102 can include a system port 106, a first port 108, a second port 110, and a third port 112 all in fluid communication via the hollow chamber 104. The system port 106 can include a system coupling 114 for coupling the valve core removal tool 100 to the air-conditioning system 101, with the first port 108, the second port 110, and the third port 112 each connecting to the system port 106 through channels within the hollow chamber 104. The system coupling 114 can include a ¼ inch fitting, as an example. A skilled artisan can select a suitable fitting for coupling the system port 106 and the air-conditioning system 101 within the scope of the present disclosure. The interconnected configuration within the main body 102 can allow refrigerant and vacuum flow to move through the hollow chamber 104 between the system port 106 and the first port 108, the second port 110, and/or the third port 112 when the respective valve for each port 108, 110, 112 is open. The channel of each port 108, 110, 112 can facilitate fluid communication between all ports 108, 110, 112, enabling simultaneous operations through multiple ports 108, 110, 112 while maintaining connection to the air-conditioning system 101 via the system port 106.

An exterior surface 116 of the main body 102 can include a magnet 118 positioned at various locations of the main body 102, as shown in FIG. 1. The magnet 118 can allow for easy storage of the valve core removal tool 100 on a metal surface during use. The magnet 118 can be sized to provide sufficient magnetic force for secure attachment while maintaining the overall portability and ease of use of the valve core removal tool 100. A skilled artisan can select a suitable size and placement of the magnet 118 on the main body 102 within the scope of the present disclosure. Advantageously, the magnet 118 can allow the technician to temporarily secure the valve core removal tool 100 to a nearby metal surface during a field operation, keeping the valve core removal tool 100 readily accessible while performing other service tasks.

The valve core removal tool 100 can include the first port 108, the second port 110, and the third port 112 that can work together through the main body 102. The third port 112 can serve dual functionality by coupling with a valve core assembly 120 for extracting the valve core of the air-conditioning system 101 and can allow coupling to the vacuum hose 107 after the valve core assembly 120 and the valve core of the air-conditioning system 101 are removed. The first port 108 and second port 110 can allow for the main body 102 to be coupled with the vacuum gauge 103 and refrigerant gauge hose 105, enabling simultaneous pressure monitoring and refrigerant charging. The three port 108, 110, 112 configuration can militate against the need to disconnect and reconnect equipment during servicing operation. As shown in FIG. 1, the first valve 108, the second valve 110, and the third valve 112 can be coplanar. The first valve 108 and the second valve 110 can be disposed at an angle relative to the third port 112. When servicing an air-conditioning system, the technician can remove the valve core through the third port 112, and connect the vacuum hose 107 to the third port 112 while maintaining connections for the vacuum gauge 103 and refrigerant gauge hose 105 through the first port 108 and the second port 110. Advantageously, the first port 108, the second port 110, the third port 112, and the valve core assembly 120 can allow the technician to complete the service process, from valve core removal through air-conditioning system 101 evacuation and charging, with all hoses remaining connected to the valve core removal tool 100.

As shown in FIG. 2, the first port 108 can be in fluid communication with the system port 106 via a first channel 122 within the hollow chamber 104 of the main body 102. The first port 108 can include a first valve 124 for controlling flow between the system port 106 and the first port 108. The first port 108 can include a first coupling 126 that can enable connection to external equipment or an attachment. In certain embodiments, the first port 108 can be configured to couple to the vacuum gauge 103 for measuring the pressure within the air-conditioning system 101. The first port 108 can provide the ability to isolate the first channel 122 from the hollow chamber 104, which can allow the technician to protect the attachment, such as the vacuum gauge 103, from unwanted interaction, such as additional pressure, during operation.

In a similar fashion, the second port 110 can be in fluid communication with the system port 106 via a second channel 128 within the hollow chamber 104 of the main body 102, as shown in FIG. 2. The second port 110 can include a second valve 130 for controlling flow between the system port 106 and the second port 110. The second port 110 can include a second coupling 132 that can enable connection to external equipment or an attachment. In certain embodiments, the second port 110 can be configured to couple to the refrigerant gauge hose 105 for charging the air-conditioning system 101 with refrigerant. The second port 110 can provide the ability to isolate the second channel 128 from the hollow chamber 104, which can allow the technician to protect the attachment, such as the refrigerant gauge hose 105, from unwanted interaction, such as additional pressure, during operation.

With continued reference to FIG. 2, the third port 112 can be in fluid communication with the system port 106 via a third channel 134 within the hollow chamber 104 of the main body 102. The third port 112 can include a third valve 136 for controlling flow between the system port 106 and the third port 112. The third port 112 can include a third coupling 138 that can enable connection to external equipment or an attachment. In certain embodiments, the third port 112 can be configured to couple to the vacuum hose 107. The third port 112 can provide the ability to isolate the third channel 134 from the hollow chamber 104, which can allow the technician to protect the attachment, such as the vacuum hose 107, from unwanted interaction, such as additional pressure, during operation.

It should be appreciated that the third port 112 can include the valve core assembly 120, which can be removably coupled to the third coupling 138, as shown in FIG. 5C. The valve core assembly 120 can have a first end 140 disposed adjacent to the third port 112 and a second end 142 opposite the first end 140. The valve core assembly 120 can include a valve core shaft 144 and a valve core engagement tool 146. The valve core assembly 120 can function as a tool for both removing and reinstalling the valve core of the air-conditioning system 101 via the third port 112. As an example, the valve core can include a Schrader® valve core sold by Pacific Industrial Co., Ltd of Gifu, Japan. With reference to FIGS. 5B-5C, the valve core shaft 144 can include a handle 148 disposed at the first end 140 for selectively moving the valve core shaft 144 within the third channel 134 of the main body 102, in operation.

As shown in FIG. 5C, the valve core engagement tool 146 can be disposed at the second end 142 of the valve core assembly 120. The valve core engagement tool 146 can be configured to interact with the air-conditioning system 101 through the system port 106. In certain embodiments, the valve core engagement tool 146 can include a magnetic tip 150 for engaging the valve core. The magnetic tip 150 can militate against the valve core becoming lost within the main body 102 as the magnetic tip 150 moves through the system port 106, the hollow chamber 104, and the third channel 134 during removal and reinstallation operations by magnetically retaining the valve core.

With reference to FIG. 5D, the third port 112 can couple the main body 102 to the vacuum hose 107 where the valve core has been removed. The dual functionality of the third port 112 can allow the technician to use the third port 112 for core removal operation and for connection with the vacuum equipment via the vacuum hose 107 to the same port for air-conditioning system 101 evacuation.

In operation, the technician can move the valve core shaft 144 such that the valve core engagement tool 146 can engage with the valve core through the system port 106, as shown in FIG. 5A. It should be appreciated that the valve core assembly 120 can incorporate a dual valve depressor that can be adjusted to accommodate different valve core depths, enabling compatibility with various valve cores found in various air-conditioning systems 101. Where the valve core engagement tool 146 is engaged with the valve core, the technician can move the valve core shaft 144 out of the third port 112 such that the valve core engagement tool 146 removes the valve core from the air-conditioning system 101 and the valve core is pulled through the system port 106, the hollow chamber 104, and the third channel 134, eventually exiting the main body 102 via the third port 112, as shown in FIG. 5B. As the valve core is removed, the valve core assembly 120 can be detached from the third coupling 138 of the third port 112, as shown in FIG. 5C, and enable the third port 112 to transition to function as a coupling with the vacuum hose 107, as shown in FIG. 5D. Where the air-conditioning system 101 has been serviced, the valve core assembly 120 can be reattached to the third coupling 138 to facilitate reinstallation of the valve core.

The first coupling 126, the second coupling 132, and the third coupling 138 can be manufactured from a durable material such as brass or nickel-plated fittings that can militate against wear and tear from repeated use in an industrial application. The materials for forming the first coupling 126, the second coupling 132, and the third coupling 138 can be selected to militate against corrosion from the refrigerant and moisture while maintaining structural integrity throughout multiple service operations. The first coupling 126, the second coupling 132, and the third coupling 138 can also include the ability to self-seal, which can militate against a leak when removing a hose or an attachment. A skilled artisan can select a suitable material for constructing the first coupling 126, the second coupling 132, and the third coupling 138 within the scope of the present disclosure.

As shown in FIG. 1, the main body 102 can include a sight glass 152 that can enable visual confirmation of valve core removal during a service operation. The sight glass 152 can be disposed on the main body 102 adjacent the hollow chamber 104 and the third channel 134 to provide visibility of the hollow chamber 104. The sight glass 152 can be various sizes and shapes to allow for various portions of the hollow chamber 104 to be viewed in operation. A skilled artisan can select a suitable size and shape for the sight glass 152 within the scope of the present disclosure. The sight glass 152 can include an anti-fog coating to assist with long-term clarity and durability during use. In certain embodiments, the sight glass 152 can include a light source, such as a LED light, for example. The placement of the sight glass 152 can allow the technician to visually verify that the valve core has been removed before proceeding with vacuum and charging operations. The sight glass 152 can be constructed from a durable, scratch-resistant material such as tempered glass or a high-strength polycarbonate to withstand servicing parameters. A skilled artisan can select a suitable material for constructing the sight glass 152 within the scope of the present disclosure.

With renewed reference to FIG. 2, the first valve 124, the second valve 130, and third valve 136 can include a ball valve 154. Alternatively, the first valve 124, the second valve 130, and third valve 136 can include other valve types such as a needle valve, a precision metering valve for fine-tuned refrigerant flow control, a quick-acting valve mechanism that can utilize spring-loaded or toggle-style configuration, and combinations thereof. It should also be appreciated that the first valve 124, the second valve 130, and third valve 136 can be different types of valves or the same type of valve. A skilled artisan can select a suitable valve type for the first valve 124, the second valve 130, and third valve 136 within the scope of the present disclosure. The valves 124, 130, 136 can also include a self-sealing valve to militate against fluid bypass when removing a hose or an attachment. Additionally, the valves 124, 130, 136 can permit multi-stage vacuum isolation that can allow for vacuum control during an evacuation operation. It should be appreciated that the first valve 124, the second valve 130, and the third valve 136 can include a ¼ inch turn valve, for example.

Each of the first valve 124, the second valve 130, and third valve 136 can include a valve handle 156. The valve handle 156 can be disposed on one side or both sides of the main body 102, allowing for the technician to easily access the valve handle 156 in operation. The valve handle 156 can have a quadrilateral cross section. Alternatively, the valve handle 156 can have a cross section of any shape to allow for opening and closing during the service operation. A skilled artisan can select a suitable size and shape for the valve handle 156 within the scope of the present disclosure.

It should be appreciated that the first valve 124, the second valve 130, and third valve 136 can be movable between an open position and a closed position, where the open position can allow for fluid communication through the respective channels between the system port 106 and each individual port 108, 110, 112. During the valve core removal operation, the valves 124, 130, 136 can be positioned to enable access to the valve core through the third port 112 while maintaining isolation of the first port 108 and second port 110. Where the valve core is removed, all three valves 124, 130, 136 can be opened to enable simultaneous vacuum operation, pressure monitoring, and preparation for charging. During the charging process, the technician can selectively close specific a valve, such as closing the third valve 136 coupled to the vacuum hose 107 and the first valve 124 coupled to the vacuum gauge 103, while maintaining the open position of the second valve 130 needed for refrigerant flow via the refrigerant gauge hose 105. The ability to independently control fluid flow through each port 108, 110, 112 by moving the valves 124, 130, 136 between their respective open positions and closed positions can enable the technician to perform multiple sequential operations without disconnecting equipment, from initial core removal through system evacuation and final charging.

Each of the first port 108, the second port 110, and the third port 112 can include a removable magnetic cap 158 that can provide closure where the port 108, 110, 112 is not in use. The magnetic cap 158 can work in conjunction with other magnetic components of the tool, including the magnet 118 of the main body 102, to create an integrated system for securing components. The magnetic cap 158 can be positioned on top of each port 108, 110, 112 and can militate against contamination or debris from entering the ports 108, 110, 112 where the ports 108, 110, 112 are not connected to the air-conditioning system 101 or an attachment. The magnetic cap 158 can also provide a convenient and temporary storage option during the service operation, allowing the technician to secure the magnetic cap 158 on a nearby metal surface while performing the maintenance task. The magnetic cap 158 can allow the technician to maintain cleanliness where the ports 108, 110, 112 are not actively being used for vacuum, charging, or core removal operations.

Each of the first port 108, second port 110, and third port 112 can include a port attachment 160 that can enable connection of the port 108, 110, 112 to a different sized attachment such as the vacuum gauge 103, the refrigerant gauge hose 105, and the vacuum hose 107, providing flexibility in equipment/attachment compatibility during the service operation, shown in an exemplary embodiment in FIG. 2 on the third port 112. The port attachment 160 can allow the technician to adapt the valve core removal tool 100 for use with various sizes of vacuum gauges 103, refrigerant gauge hoses 105, and vacuum equipment. The port attachment 160 can allow the valve core removal tool 100 to operate with different service ports without requiring an additional tool, which can aid with coupling various types of air-conditioning systems and service equipment.

In certain embodiments, the valve core removal tool 100 can include wireless connectivity, such as Bluetooth® connectivity, that can enable syncing with a mobile application for remote monitoring of the pressure within the valve core removal tool 100 during the service operation. The wireless connectivity can support smart valve operation, allowing for motorized control of the valves 124, 130, 136 through an application or automated sequence programming. The valve core removal tool 100 can also include a remote alarm notification, which can be integrated into the mobile application to alert the technician of vacuum or pressure disturbances during service operations.

In certain embodiments, the valve core removal tool 100 can include an auto calibration means that can promote long-term accuracy of the gauges coupled to the valve core removal tool 100. The digital components of the valve core removal tool 100 can be powered through wireless charging, militating against the need for external batteries. The valve core removal tool 100 can also include a rechargeable power supply that can provide a universal charging port for all digital features.

The present disclosure provides a valve core removal system 200 for an air-conditioning system 101, shown in FIGS. 5A-5D. The valve core removal system 200 can include the valve core removal tool 100, the vacuum gauge 103, the refrigerant gauge hose 105, and a vacuum hose 107. The vacuum gauge 103 can be removably coupled to the first port 108 of the valve core removal tool 100. The vacuum gauge 103 can measure a pressure within the air-conditioning system 101. The refrigerant gauge hose 105 can be removably coupled to the second port 110. The refrigerant gauge hose 105 can be used to charge the air-conditioning system 101 with a refrigerant. The vacuum hose 107 can be removably coupled to the third port 112. The vacuum hose 107 can remove a contaminant from within the air-conditioning system.

The present disclosure provides a method 300 for servicing an air-conditioning system 101 having a valve core with a vacuum gauge 103, a refrigerant gauge hose 105, and a vacuum hose 107, as shown in FIGS. 6A-6C. The method can include a step 302 of providing the valve core removal tool 100, as described herein. In a step 304, the method 300 can include coupling the valve core removal tool 100 to the air-conditioning system 101 via the system port 106. The valve core of the air-conditioning system 101 can be removed with the valve core engagement tool 146 in a step 306, as described herein, such that the valve core assembly 120 is removed from the valve core removal tool 100. The method 300 can include coupling the vacuum hose 107 to the third coupling 138 of the third port 112 in a step 308. In a step 310, the refrigerant gauge hose 105 and the vacuum gauge 103 can be coupled to the first port 108 and the second port 110. The method 300 can include charging the air-conditioning system 101 in a step 312.

The step 312 of charging the air-conditioning system 101 can include a step 314 of placing the first valve 124, the second valve 130, and the third valve 136 in an open position to allow for flow between the valve core removal tool 100, the vacuum gauge 103, the refrigerant gauge hose 105, vacuum hose 107, and air-conditioning system 101. The method 300 can include a step 316 of operating a vacuum pump via the vacuum hose 107 and the refrigerant gauge hose 105. The third valve 136 coupled to the vacuum hose 107 can be moved to a closed position in a step 318. In a step 320, the second valve 130 coupled to the vacuum gauge 103 can be moved to the closed position. The vacuum hose 107 can be uncoupled to from the third port 112 in a step 322. The method 300 can include a step 324 of coupling the valve core engagement tool 146 and the valve core to the valve core removal tool 100 and a step 326 of reinstalling the valve core into the air-conditioning system 101.

It should be appreciated that the method 300 can further include a step 328 of providing another valve core removal tool 100' for charging the air-conditioning system 101. Where the valve core removal tool 100 can be coupled to a suction side the air-conditioning system 101, the another valve core removal tool 100' can be coupled to a liquid side of the air-conditioning system 101 to effectively charge the system.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A valve core removal tool for an air-conditioning system, comprising:
   a main body defining a hollow chamber;
   a system port for coupling to the air-conditioning system;
   a first port in fluid communication with the system port via a first channel, the first port including a first valve for controlling flow between the system port and the first port and a first coupling;
   a second port fluid communication with the system port via a second channel, the second port including a second valve for controlling flow between the system port and the second port and a second coupling; and
   a third port in fluid communication with the system port via a third channel, the third port including
      a third valve for controlling flow between the system port and the third port;
      a third coupling, and
      a valve core assembly removably coupled to the third coupling and including a valve core engagement tool at a first end of the valve core assembly and configured to interact with the air-conditioning system through the system port, and a valve core shaft disposed at a second end of the valve core assembly and configured to move the valve core engagement tool within the main body.

2. The valve core removal tool of claim 1, wherein the first port is configured to be coupled to a vacuum gauge.

3. The valve core removal tool of claim 1, wherein the second port is configured to be coupled to a refrigerant gauge hose.

4. The valve core removal tool of claim 1, wherein the third port is configured to be coupled to a vacuum hose.

5. The valve core removal tool of claim 1, wherein the main body includes a sight glass.

6. The valve core removal tool of claim 1, wherein the main body includes a magnet.

7. The valve core removal tool of claim 1, wherein each of the first port, the second port, and the third port includes a removable magnetic cap.

8. The valve core removal tool of claim 1, wherein each of the first port, the second port, and the third port includes a port attachment to enable a connection to a different sized attachment port.

9. The valve removal tool of claim 1, wherein each of the first valve, the second valve, and the third valve includes a ball valve.

10. The valve removal tool of claim 1, wherein each of the first valve, the second valve, and the third valve is movable between an open position and a closed position, the open position allowing for fluid communication therethrough.

11. The valve removal tool of claim 1, wherein each of the first valve, the second valve, and the third valve includes a valve handle.

12. The valve removal tool of claim 1, wherein the first port, the second port, and the third port are coplanar.

13. A valve core removal system for an air-conditioning system, comprising:
    a valve core removal tool including
        a main body defining a hollow chamber;
        a system port for coupling to the air-conditioning system;
        a first port in fluid communication with the system port via a first channel, the first port including a first valve for controlling flow between the system port and the first port and a first coupling;
        a second port fluid communication with the system port via a second channel, the second port including a second valve for controlling flow between the system port and the second port and a second coupling; and
        a third port in fluid communication with the system port via a third channel, the third port including
            a third valve for controlling flow between the system port and the third port,
            a third coupling, and
            a valve core assembly removably coupled to the third coupling and including
                a valve core engagement tool at a first end of the valve core assembly and configured to interact with the air-conditioning system through the system port, and
                a valve core shaft disposed at a second end of the valve core assembly and configured to move the valve core engagement tool within the main body;
    a vacuum gauge for measuring a pressure within the air-conditioning system and removably coupled to the first port;
    a refrigerant gauge hose for charging the air-conditioning system with a refrigerant and removably coupled to the second port; and
    a vacuum hose for removing a contaminant from within the air-conditioning system and removably coupled to the third port.

14. A method for servicing an air-conditioning system with a valve core with a vacuum hose, a refrigerant gauge hose, and a vacuum gauge, comprising:
    providing a valve core removal tool including
        a main body defining a hollow chamber;
        a system port for coupling to the air-conditioning system;
        a first port in fluid communication with the system port via a first channel, the first port including a first valve for controlling flow between the system port and the first port and a first coupling;
        a second port fluid communication with the system port via a second channel, the second port including a second valve for controlling flow between the system port and the second port and a second coupling; and
        a third port in fluid communication with the system port via a third channel, the third port including
            a third valve for controlling flow between the system port and the third port,
            a third coupling, and
            a valve core assembly removably coupled to the third coupling and including
                a valve core engagement tool at a first end of the valve core assembly and configured to interact with the air-conditioning system through the system port, and
                a valve core shaft disposed at a second end of the valve core assembly and configured to move the valve core engagement tool within the main body;
    coupling the valve core removal tool to the air-conditioning system;
    removing the valve core of the air-conditioning system with the valve core engagement tool;
    coupling the vacuum hose to the third coupling of the third port;
    coupling the refrigerant gauge hose and the vacuum gauge to the first port and the second port; and
    charging the air-conditioning system.

15. The method of claim 14, further including providing another valve core removal tool and coupling the another valve core removal tool to the air-conditioning system.

16. The method of claim 14, further including placing each of the first valve, the second valve, and the third valve in an open position.

17. The method of claim 16, further including operating the vacuum hose and the refrigerant gauge hose.

18. The method of claim 17, further including moving the third valve coupled to the vacuum hose to a closed position and moving the second valve coupled to the vacuum gauge to a closed position.

19. The method of claim 18, further including uncoupling the vacuum hose from the third port.

20. The method of claim 19, further including coupling the valve core engagement tool and valve core to the valve core removal tool and reinstalling the valve core into the air-conditioning system.

* * * * *